Feb. 20, 1968 R. R. REISER 3,370,237

COUNTING CIRCUIT EMPLOYING THREE SWITCHING DEVICES INTERCONNECTED BY PARTICULAR LOGIC CIRCUIT FOR OPERATION IN PREDETERMINED SEQUENCE

Filed July 1, 1965 2 Sheets-Sheet 1

INVENTOR
RALPH R. REISER
BY Q. C. Smith
ATTORNEY

FOUR R CODE STATE TABLE — STATE DETECTION
| CODE STATE | A | B | C | D | CODE STATE | a | b | A a | A b | B a | B b | C a | C b | D a | D b |
|---|---|---|---|---|---|---|---|---|---|---|---|---|---|---|---|
| 0 | 0 | 0 | 0 | 0 | 0 | $\bar{A}\bar{B}\bar{D}$ | | 0 | | 0 | | | | 0 | |
| 1 | 1 | 0 | 0 | 0 | 1 | $A\bar{B}\bar{D}$ | | 1 | | 0 | | | | 0 | |
| 2 | 0 | 1 | 0 | 0 | 2 | $\bar{A}B\bar{C}$ | | 0 | | 1 | | 0 | | | |
| 3 | 1 | 1 | 0 | 0 | 3 | $AB\bar{C}$ | | 1 | | 1 | | 0 | | | |
| 4 | 0 | 1 | 1 | 0 | 4 | $\bar{A}BC$ | $\bar{A}C\bar{D}$ | 0 | 0 | 1 | | 1 | 1 | | 0 |
| 5 | 1 | 1 | 1 | 0 | 5 | $ABC$ | $AC\bar{D}$ | 1 | 1 | 1 | | 1 | 1 | | 0 |
| 6 | 0 | 0 | 1 | 1 | 6 | $\bar{A}\bar{B}C$ | $\bar{A}CD$ | 0 | 0 | 0 | | 1 | 1 | | 1 |
| 7 | 1 | 0 | 1 | 1 | 7 | $A\bar{B}C$ | $ACD$ | 1 | 1 | 0 | | 1 | 1 | | 1 |
| 8 | 0 | 0 | 0 | 1 | 8 | $\bar{A}\bar{C}D$ | | 0 | | | | 0 | | 1 | |
| 9 | 1 | 0 | 0 | 1 | 9 | $A\bar{C}D$ | | 1 | | | | 0 | | 1 | |
Figure 3
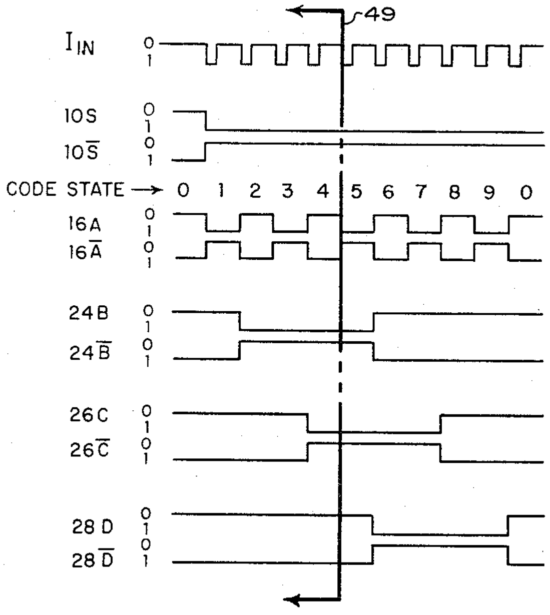
Figure 2a
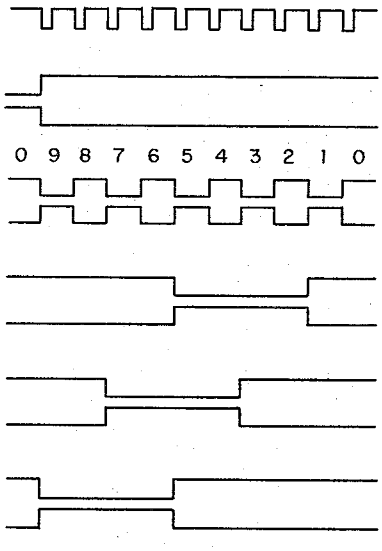
Figure 2b
INVENTOR
RALPH R. REISER
BY Q. C. Smith
ATTORNEY

United States Patent Office 3,370,237

Patented Feb. 20, 1968

3,370,237

COUNTING CIRCUIT EMPLOYING THREE SWITCHING DEVICES INTERCONNECTED BY PARTICULAR LOGIC CIRCUIT FOR OPERATION IN PREDETERMINED SEQUENCE

Ralph R. Reiser, San Jose, Calif., assignor to Hewlett-Packard Company, Palo Alto, Calif., a corporation of California Filed July 1, 1965, Ser. No. 468,900

13 Claims. (Cl. 328—41)

ABSTRACT OF THE DISCLOSURE

A gating circuit connects three binaries for division by five to provide a dual input counting circuit in which each of the binaries has the same output waveform whether the logic of the counting circuit is advanced in a forward or a backward direction. Two more binaries are connected to the dual input of this counting circuit to provide a reversible decade.

Figure 1:
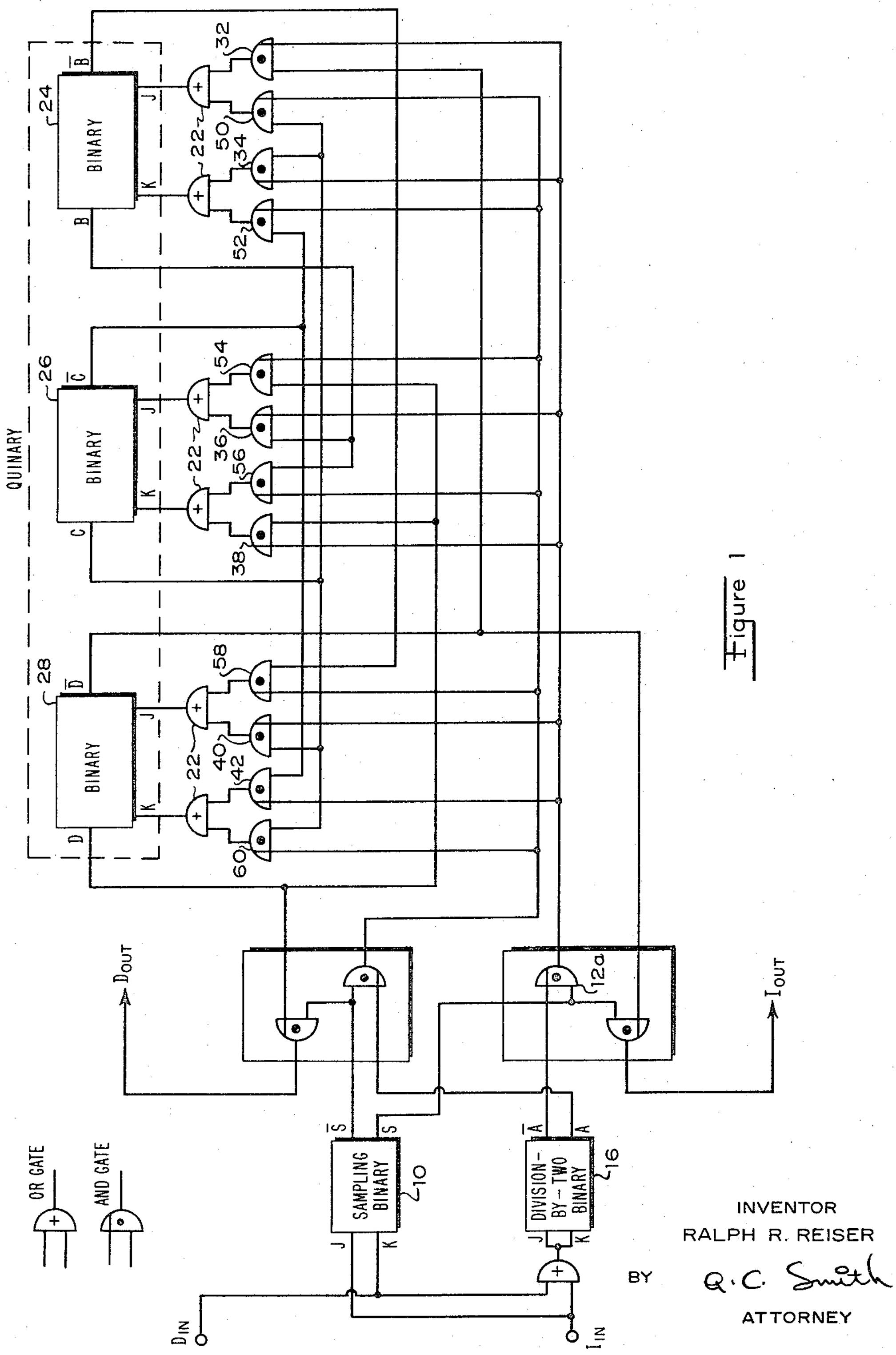

This invention relates to logic codes, and more particularly, to a new and improved quinary code. The term "quinary code" as herein used includes those codes commonly referred to as bi-quinary and qui-binary codes.

It is the principal object of this invention to provide an improved logic code having more uniform switching in the quinary for each change of state than, for example, the conventional 1·2·2·4 and 1·2·4·8 codes.

Another object of this invention is to provide an improved logic code that may be easily reversed.

Still another object of this invention is to provide an improved logic code that may be easily converted, for example, to a conventional quinary code such as the 1·2·2·4 or the 1·2·4·8 code.

In accordance with the illustrated embodiment of this invention there is provided an improved quinary logic code comprising a set of logic elements connecting three binaries for division by five, such that each of the binaries has the same output waveform whether the logic is advanced in a forward or backward direction. This logic code is hereinafter referred to as the four R (4R) code.

Other and incidental objects of this invention will become apparent from a reading of this specification and an inspection of the accompanying drawing in which:

FIGURE 1 is a schematic diagram of a reversible decade employing the four R code of this invention;

FIGURES 2*a* and 2*b* are diagrams showing representative waveforms at the outputs of the binaries of FIGURE 1; and FIGURE 3 is a logic diagram showing how the state of the four R code may be detected.

The four R code has many applications. As shown in FIGURE 1, for example, it may be employed in a reversible decade of the type shown and described in my co-pending patent application Ser. No. 466,952, entitled Decade and filed on June 25, 1965. The four R code comprises AND gates 32 through 42 and three binaries 24, 26, and 28 connected for division-by-five. A division-by-two binary 16 is also included to provide a four R code suitable for division by ten. This four R code is connected in the reversible decade for advancement in the forward direction to increase the magnitude stored in the reversible decade. The operation of the reversible decade is herein repeated only insofar as it relates to the following detailed description of the four R code.

Referring now to FIGURES 1 and 2*a*, it is initially assumed that the S output and the complementary or $\overline{S}$ output of sampling binary 10 are in the "0" and "1" states, respectively, corresponding to what is hereinafter referred to as the K condition of the binary. As shown in FIGURE 2*a*, the complementary output of each of the binaries 16, 24, 26, and 28 is also in the "1" state, and the other output of each of these binaries is in the "0" state. Thus, these binaries are also initially in the K condition. The sampling binary 10 is connected to switch into the J condition in which the S output is in the "1" state and the complementary or $\overline{S}$ output is in the "0" state, when a pulse is applied at its J input. When a pulse is applied to the K input of sampling binary 10, it is connected to switch to the K condition in which the S output is in the "0" state and the complementary or $\overline{S}$ output is in the "1" state. The binaries 24, 26, and 28 of the quinary are similarly connected. Thus, application of the first of ten successive input pulses to the increase magnitude input $I_{in}$, and, hence, to the J input of sampling binary 10, switches the sampling binary from its initial K condition to the J condition causing it to generate a "1" signal at the S output and a "0" signal at the complementary or $\overline{S}$ output. This "1" signal from the S output of sampling binary 10 makes AND gate **12*a* ready for activation. The division-by-two binary 16 is connected for being switched by each input pulse applied thereto. Thus, the first input pulse also switches the division-by-two binary 16 from its initial K condition to the J condition causing it to generate a "1" signal at the A output and a "0" signal at the complementary or $\overline{A}$ output. This "0" signal from the complementary or $\overline{A}$ output of the division-by-two binary 16 does not activate AND gate 12*a***.

The remaining input pulses of the ten input pulses being considered here do not switch the sampling binary 10 since they are all applied to the J input thereof and the S and $\overline{S}$ outputs are already in the corresponding J condition. However, since the division-by-two binary 16 is connected to be switched by each input pulse, it is switched from the J condition to the K condition by the second input pulse so that a "0" signal is generated at the A output and a "1" signal at the $\overline{A}$ output. The leading edge or regenerative transition of this "1" signal from the $\overline{A}$ output activates AND gate **12*a* and is applied thereby to activate AND gates 32 and 42 which are made ready for activation by the "1" logic level signal from the $\overline{D}$ and $\overline{C}$ outputs of binaries 28 and 26 respectively. It is important to note at this point that all of the AND gates mentioned in this description are constructed to be activated only by the leading edge or regenerative transition of the "1" signals generated at the outputs of the division-by-two binary 16 when a "1" logic level signal is applied to the control input of the gate (as shown in FIG. 1, the input which terminates on the input side of the gate) by one of the binaries. The activated AND gate 32 is connected by an OR gate 22 to drive the J input of binary 24 thereby causing it to switch from its initial K condition to the J condition so as to generate a "1" signal at its B output and a "0" signal at its $\overline{B}$ output. This "1" signal from the B output makes AND gate 36 ready for activation. The activated AND gate 42 is connected by an OR gate 22 to drive the K input of binary 28. However, this activation of AND gate 42 does not switch binary 28**, since the D and $\overline{D}$ outputs are already in the respective "0" and "1" states of the K condition corresponding to a driving signal at the K input.

The third input pulse again switches the division-by-two binary 16 causing it to generate a "0" signal at the $\overline{A}$ output and a "1" signal at the A output so that AND gate **12*a* is deactivated. This deactivation of AND gate 12*a* removes the driving "1" signal from AND gates 32 through 42, but does not alter the signal condition of the outputs of binaries 24 through 28** of the quinary.

The fourth input pulse switches the division-by-two binary 16 causing it to generate a "1" signal at the $\bar{A}$ output and a "0" signal at the A output. The leading edge or regenerative transition of this "1" signal from the $\bar{A}$ output again activates AND gate 12*a* and is applied thereby to activate AND gates 32, 36, and 42 which are made ready for activation by the "1" signal from the $\bar{D}$, B, and $\bar{C}$ outputs of binaries 28, 24, and 26 respectively. The activated AND gate 42 does not alter the condition of binary 28 for the same reason discussed above in connection with the second input pulse. Similarly, the activated AND gate 32 does not alter the condition of binary 24 since it is already in the corresponding J condition. However, the activated AND gate 36, which is connected by an OR gate 22 to drive the J input of binary 26, switches binary 26 from its initial K condition to the J condition causing it to generate a "1" signal at the C output and a "0" signal at the $\bar{C}$ output. These "1" and "0" signals from the C and $\bar{C}$ outputs respectively make AND gates 34 and 40 ready for activation and deactivate AND gate 42 by removing the "1" control signal therefrom.

The fifth input pulse switches the division-by-two binary 16 so as to deactivate the AND gate 12*a* in the same manner and with the same effect as described in connection with the third input pulse.

The sixth input pulse switches the division-by-two binary 16 causing it to activate the AND gate 12*a* as previously described in connection with the second and fourth input pulses. The activated AND gate 12*a*, accordingly, applies the "1" signal from the $\bar{A}$ output of the division-by-two binary 16 to activate AND gates 32, 36, 34, and 40 which are made ready for activation by the "1" signal from the $\bar{D}$, B, and C outputs of binaries 28, 24, and 26 respectively. The activated AND gates 32 and 36 are connected to drive the J inputs of binaries 24 and 26 respectively, but do not switch these binaries since they are already in the corresponding J condition. The activated AND gate 34 is connected by an OR gate 22 to drive the K input of binary 24 thereby causing it to switch from the J condition to the K condition so as to generate a "0" signal at the B output and a "1" signal at the $\bar{B}$ output. This "0" signal from the B output deactivates AND gate 36 by removing the "1" control signal therefrom. The activated AND gate 40 is connected by an OR gate 22 to drive the J input of binary 28 thereby causing it to switch from its initial K condition to the J condition so as to generate a "1" signal at the D output and a "0" signal at the $\bar{D}$ output. These "1" and "0" signals respectively make AND gate 38 ready for activation and deactivate AND gate 32 by removing the "1" control signal therefrom.

The seventh input pulse switches the division-by-two binary 10 so as to deactivate the AND gate 12*a* in the same manner and with the same effect as described in connection with the third and fifth input pulses.

The eighth input pulse switches the division-by-two binary 16 as described in connection with the preceding even number input pulses to activate the AND gate 12*a*. The activated AND gate 12*a* applies the "1" signal from the $\bar{A}$ output of the division-by-two binary 16 to activate AND gates 38, 34 and 40 which are made ready for activation by the "1" signal from the D and C outputs of binaries 28 and 26 respectively. The activated AND gates 34 and 40 are connected to drive the K and J inputs, respectively, of binaries 24 and 28, but since these binaries are already in the corresponding K and J conditions, as previously described, they are not switched. However, the activated AND gate 38, which is connected by an OR gate 22 to drive the K input of binary 26, causes binary 26 to switch from the J condition to the K condition so as to generate "1" and "0" signals at the respective outputs $\bar{C}$ and C. The "1" signal from the $\bar{C}$ output makes AND gate 42 ready for activation and the "0" signal from the C output deactivates AND gate 34 by removing the "1" control signal therefrom.

The ninth input pulse deactivates the AND gate 12*a* as previously described above.

The tenth input pulse switches the division-by-two binary 16 so as to activate the AND gate 12*a* and apply the "1" signal from the $\bar{A}$ output of the division-by-two binary 16 to activate AND gate 42 which is made ready for activation by a "1" signal from the $\bar{C}$ output of binary 26. As previously described the activated AND gate 42 is connected by an OR gate 22 to drive the K input of binary 28 causing it to switch from the J condition to the K condition so as to generate a "0" signal at the D output and a "1" signal at the $\bar{D}$ output. These "0" and "1" signals from the D and $\bar{D}$ outputs, respectively, deactivate AND gate 38 and make AND gate 32 ready for activation as previously described. Thus, the tenth input pulse returns the binaries and gates comprising the four R code to their initial condition.

A decade embodying the four R code such as this may readily be adapted to count, for example, to five. This is done by connecting the AND gates 32 through 42 and the binaries 16 through 28 in a manner to recycle the binaries 16 through 28 when the fifth state of the four R code is reached, as indicated by the dashed line 49 in FIGURE 2*a*. Similarly, the decade can be adapted to count continuously to any other number less than ten by connecting it to recycle when the corresponding state of the four R code is reached. The following conversion table indicates how the binaries 16 through 28 may be connected to provide a decade embodying the four R code for counting continuously to any number less than ten, where the binaries have the waveforms shown in FIGURE 2*a*.

CONVERSION TABLE

| DIVIDE BY | BINARY 16 | | BINARY 24 | | BINARY 26 | | BINARY 28 | | OUTPUT OF DECADE |
|---|---|---|---|---|---|---|---|---|---|
| | J | K | J | K | J | K | J | K | |
| 1 | | 1 | | 1 | | 1 | | 1 | INPUT = OUTPUT |
| 2 | 1 | 1 | | 1 | | 1 | | 1 | $\bar{A}$ |
| 3 | $\bar{B}$ | 1 | A | 1 | | 1 | | 1 | $\bar{B}$ |
| 4 | 1 | 1 | A | A | | 1 | | 1 | $\bar{B}$ |
| 5 | $\bar{C}$ | 1 | A | C | $A \cdot B$ | 1 | | 1 | $\bar{B}$ $\bar{C}$ |
| 6 | 1 | 1 | A | $A \cdot C$ | $A \cdot B$ | A $A \cdot B$ | | 1 | $\bar{B}$ $\bar{C}$ |
| 7 | $B+\bar{C}$ | 1 | A $A \cdot \bar{D}$ | $A \cdot C$ | $A \cdot B$ | D | $A \cdot C$ | 1 | $\bar{C}$ $\bar{D}$ |
| 8 | 1 | 1 | $A \cdot \bar{D}$ $A \cdot \bar{C}$ | $A \cdot C$ | $A \cdot B$ | $A \cdot \bar{B}$ | $A \cdot C$ | A | $\bar{C}$ $\bar{D}$ |
| 9 | $C+\bar{D}$ | 1 | $A \cdot \bar{D}$ $A \cdot \bar{C}$ | $A \cdot C$ | $A \cdot B$ | $A \cdot \bar{B}$ | $A \cdot C$ | $\bar{C}$ | $\bar{D}$ |
| 10 | 1 | 1 | $A \cdot \bar{D}$ | $A \cdot C$ | $A \cdot B$ | $A \cdot \bar{B}$ | $A \cdot C$ | $A \cdot \bar{C}$ | $\bar{D}$ |
| COL. NO'S. | 1st | 2nd | 3rd | 4th | 5th | 6th | 7th | 8th | 9th | 10th |

Two examples will illustrate how to read this table.

To adapt the decade for division by five, as indicated in the corresponding row, the $\bar{C}$ output of binary 26 is connected as the control input of an AND gate which is connected to apply the input signals to be counted to the J input of binary 16. This is indicated by the "$\bar{C}$" in the second column of the division-by-five row. The K inputs of binaries 16, 26, and 28 are each connected to receive the input signals to be counted directly. This is indicated by the "1" in the third, seventh, and ninth columns of the division-by-five row. The A output of binary 16 is connected as the control input of an AND gate which is connected to apply the input signals to be counted to the J input of binary 24, and the C output of binary 26 is similarly connected to the K input of binary 24. This is indicated by the "A" and "C" in the fourth and fifth columns, respectively, of the division-by-five row. The A and B outputs of binaries 16 and 24, respectively, are connected as dual control inputs of an AND gate connected to apply the input signals to be counted to the J input of binary 26 as indicated by the "$A \cdot B$" in the sixth column. As further indicated by the blank space in the eighth column, the J input of binary 28 needn't be connected to anything. The output of the decade may, for division by five, be taken from either the $\overline{B}$ output of binary 24 or the $\overline{C}$ output of binary 26. This is indicated by the "$\overline{B}$" and the "$\overline{C}$" in the divided tenth column.

The decade may be adapted for division by seven, as indicated in the corresponding row. The B output of binary 24 is connected as the control input of an AND gate which is connected to apply the input signals to be counted to one input of an OR gate. Similarly, the $\overline{C}$ output of binary 26 is connected as the control input of another AND gate which is connected to apply the input signals to be counted to another input of the last-mentioned OR gate. The output of this OR gate is connected to the J input of binary 16. These connections are indicated by the "$B+\overline{C}$" in the second column. As indicated by the "1" in the third and ninth columns, the K inputs of binaries 16 and 28 are each connected to receive the input signals to be counted directly. The A output of binary 16 is connected as the control input of an AND gate which is connected to apply the input signals to be counted to the J input of binary 24. Alternatively, the A and $\overline{D}$ outputs of binaries 16 and 28, respectively, are connected as dual control inputs of an AND gate connected to apply the input signals to be counted to the J input of binary 24. These alternative connections are indicated in the divided fourth column by "A" and "$A\cdot\overline{D}$," respectively. As indicated by the "$A\cdot C$" in the fifth column, the A and C outputs of binaries 16 and 26, respectively, are connected as dual control inputs of an AND gate connected to apply the input signals to be counted to the K input of binary 24. The "$A\cdot C$" in the eighth column indicates that the J input of binary 28 is connected in the same manner. As indicated by the "$A\cdot B$" in the sixth column, the A and B outputs of binaries 16 and 24, respectively, are similarly connected to the J input of binary 26. The D output of binary 28 is connected as the control input of an AND gate which is connected to apply the input signals to be counted to the K input of binary 26. This is indicated by the D in the seventh column. The output of the decade may, for division by seven, be taken from either the $\overline{C}$ output of binary 26 or the $\overline{D}$ output of binary 28, as indicated by the "$\overline{C}$" and the "$\overline{D}$" in the divided tenth column.

It is important to note that in each of the cases indicated in the above conversion table, the decade has the potential operating states indicated by the waveforms of FIGURE 2*a* and the logic diagram of FIGURE 3. Each of these potential operating states corresponds to each of the binaries 16 through 28 being in one of two stable conditions as already defined herein. For purposes of the claims appended to this specification these two conditions may conveniently be indicated by the terms "flip" and "flop," with the term "flip" arbitrarily referring to one of the two stable conditions, and the term "flop" arbitrarily referring to the other stable condition.

AND gates 50 through 60 connect the A output of the division-by-two binary 16 to the binaries 24 through 28 of the quinary to form a four R code adapted for advancement in the backward direction to decrease the magnitude stored in the reversible decade. The operation of the four R code in the backward direction may readily be understood in view of the preceding description with the aid of the waveform shown in FIGURE 2*b*.

As illustrated by the waveforms of FIGURES 2*a* and 2*b*, the four R code may be easily reversed, and is therefore especially suitable for use in a reversible decade such as the one shown in FIGURE 1. However, the four R code is also well suited for many simpler applications where the division-by-two binary 16 shown in FIGURE 1 could simply be replaced by a source of input pulses for advancing the logic of the code. It is also apparent that the AND gate 12*a* shown in the reversible decade is not essential in most applications and is not a part of the four R code.

The three binaries 24 through 28 of the quinary each have the same waveforms whether the four R code is advanced in the forward or backward direction. This is readily apparent from a consideration of the waveforms of FIGURES 2*a* and 2*b*, and the state table of FIGURE 3 which shows that the waveforms of each binary 24 through 28 have four "1" states and six "0" states. In addition, the quinary is switched more uniformly for each change of state when connected in the four R code than when connected, for example, in such conventional codes as the 1·2·2·4 or the 1·2·4·8 codes. To say that the quinary is switched more uniformly when connected in the four R code means that the four R code presents more nearly the same impedance to the driving source for each state of the code than either the 1·2·2·4 or the 1·2·4·8 code. More specifically, the ratio of the maximum to the minimum number of gates required to be activated to obtain all five states of the quinary is lower and more nearly constant than with the 1·2·2·4 and 1·2·4·8 codes. The state of the four R code may easily be determined, as indicated for each state in the state detection chart of FIGURE 3, by sampling the designated output of three of the four binaries 16, 24, 26, and 28.

Another important advantage of the four R code is that is may readily be converted, if required, for example, to either the 1·2·2·4 or the 1·2·4·8 code commonly used in many instruments. The necessary conversion logic is indicated in the following table:

CONVERSION LOGIC

| 1.2.2.4=Four R | 1.2.4.8=Four R |
|---|---|
| A=A | A=A |
| $B=B+\overline{C}.D$ | $B=B.\overline{C}+\overline{B}.C$ |
| C=C+D | C=C |
| D=D | $D=D.\overline{C}$ |

As is readily apparent from the above table, the A and D outputs of binaries 16 and 28 are connected in the same manner for conversion of the four R code into the 1·2·2·4 code. However, the B output of binary 24 and the output of an AND gate having the $\overline{C}$ and D outputs of binaries 26 and 28 for inputs must be connected as the inputs of an OR gate. The output of this OR gate provides the B output for the converted four R code. Similarly, the C and D outputs of binaries 26 and 28 must be connected as the inputs of a second OR gate to provide the C output for the converted four R code.

The A and C outputs of binaries 16 and 26 are connected in the same manner for conversion of the four R code into the 1·2·4·8 code. However, the output of an AND gate having the B and $\overline{C}$ output of binaries 24 and 26 for inputs must be connected as one input of an OR gate the output of which provides the B output of the converted four R code. Another input of this OR gate must be the output of an AND gate having the $\overline{B}$ and C outputs of binaries 24 and 26 for inputs. The D and $\overline{C}$ outputs of the binaries 26 and 28 must be connected to the inputs of another AND gate the output of which provides the D output of the converted four R code.

To obtain the $\overline{A}$, $\overline{B}$, $\overline{C}$, and $\overline{D}$ outputs for a four R code converted to either the 1·2·2·4 or 1·2·4·8 code, the signal from the A, B, C, and D outputs of the converted four R code need only be inverted.

I claim:

1. A logic circuit responsive to successive input signals, said circuit comprising:
   - an input for receiving the input signals;
   - first, second, and third switching devices, each having flip and flop stable operating conditions; and
   - means intercoupling said first, second, and third switching devices for cyclic operation in at least one of a forward and a reverse direction through flip-flip-flip, flop-flip-flip, flop-flop-flip, flip-flop-flop, and flip-flip-flop stable operating states, wherein the first, second, and third terms of each of said operating states respectively define the individual operating conditions of said first, second, and third switching devices during that operating state, said means also being coupled to said input for making said, first, second, and third switching devices capable of changing from each of said operating states to another of said operating states adjacent thereto in the above-named set of operating states in response to the input signals received at said input.

2. A logic circuit as in claim 1 wherein said means comprises a gating circuit intercoupling said first, second, and third switching devices for cyclic operation in a forward direction through said flip-flip-flip, flop-flip-flip, flop-flop-flip, flip-flop-flop, and flip-flip-flop operating states.

3. A logic circuit as in claim 2 wherein said gating circuit comprises:

first gating means connecting said first switching device to said input and being responsive to the operating condition of at least one of said second and third switching devices for changing said first switching device from its flip operating condition to its flop operating condition in response to a first one of the input signals and from its flop operating condition back to its flip operating condition in response to a third one of the input signals;

second gating means connecting said second switching device to said input and being responsive to the operating condition of at least one of said first and third switching devices for changing said second switching device from its flip operating condition to its flop operating condition in response to a second one of the input signals and from its flop operating condition back to its flip operating condition in response to a fourth one of the input signals; and third gating means connecting said third switching device to said input and being responsive to the operating condition of at least one of said first and second switching devices for changing said third switching device from its flip operating condition to its flop operating condition in response to the third one of the input signals and from its flop operating condition back to its flip operating condition in response to a fifth one of the input signals;

whereby said first, second, and third switching devices are made capable of changing from said flip-flip-flip operating state to said flop-flip-flip operating state in response to the first one of the input signals, from said flop-flip-flip operating state to said flop-flop-flip operating state in response to the second one of the input signals, from said flop-flop-flip operating state to said flip-flop-flop operating state in response to the third one of the input signals, from said flip-flop-flop operating state to said flip-flip-flop operating state in response to the fourth one of the input signals; and from said flip-flip-flop operating state back to said flip-flip-flip operating state in response to the fifth one of the input signals.

4. A logic circuit as in claim 3 wherein:

said first gating means is responsive to the flip operating condition of said third switching device for changing said first switching device from its flip operating condition to its flop operating condition in response to the first one of the input signals and is responsive to the flop operating condition of said second switching device for changing said first switching device from its flop operating condition to its flip operating condition in response to the third one of the input signals;

said second gating means is responsive to the flop operating condition of said first switching device for changing said second switching device from its flip operating condition to its flop operating condition in response to the second one of the input signals and is responsive to the flop operating condition of said third switching device for changing said second switching device from its flop operating condition to its flip operating condition in response to the fourth one of the input signals; and said third gating means is responsive to the flop operating condition of said second switching device for changing said third switching device from its flip operating condition to its flop operating condition in response to the third one of the input signals and is responsive to the flip operating condition of said second switching device for changing said third switching device from its flop operating condition to its flip operating condition in response to the fifth one of the input signals.

5. A logic circuit as in claim 1 wherein said means comprises a gating circuit intercoupling said first, second, and third switching devices for cyclic operation in a reverse direction through said flip-flip-flip, flop-flip-flip, flop-flop-flip, flip-flop-flop, and flip-flip-flop, operating states.

6. A logic circuit as in claim 5 wherein said gating circuit comprises:

first gating means connecting said third switching device to said input and being responsive to the operating condition of at least one of said first and second switching devices for changing said third switching device from its flip operating condition to its flop operating condition in response to a first one of the input signals and from its flop operating condition back to its flip operating condition in response to a third one of the input signals;

second gating means connecting said second switching device to said input and being responsive to the operating condition of at least one of said first and third switching devices for changing said second switching device from its flip operating condition to its flop operating condition in response to a second one of the input signals and from its flop operating condition back to its flip operating condition in response to a fourth one of the input signals; and third gating means connecting said first switching device to said input and being responsive to the operating condition of at least one of said second and third switching devices for changing said third switching device from its flip operating condition to its flop operating condition in response to the third one of the input signals and from its flop operating condition back to its flip operating condition in response to a fifth one of the input signals;

whereby said first, second, and third switching devices are made capable of changing from said flip-flip-flip operating state to said flip-flip-flop operating state in response to the first one of the input signals, from said flip-flip-flop operating state to said flip-flop-flop operating state in response to the second one of the input signals, from said flip-flop-flop operating state to said flop-flop-flip operating state in response to the third one of the input signals, from said flop-flop-flip operating state to said flop-flip-flip operating state in response to the fourth one of the input signals, and from said flop-flip-flip operating state back to said flip-flip-flip operating state in response to the fifth one of the input signals.

7. A logic circuit as in claim 6 wherein:

said first gating means is responsive to the flip operating condition of said first switching device for changing said third switching device from its flip operating condition to its flop operating condition in response to the first one of the input signals and is responsive to the flop operating condition of said second switching device for changing said third switching device from its flop operating condition to its flip operating condition in response to the third one of the input signals;

said second gating means is responsive to the flop operating condition of said third switching device for changing said second switching device from its flip operating condition to its flop operating condition in response to the second one of the input signals and is responsive to the flop operating condition of said first switching device for changing said second switching device from its flop operating condition to its flip operating condition in response to the fourth one of the input signals; and said third gating means is responsive to the flop operating condition of said second switching device for changing said first switching device from its flip operating condition to its flop operating condition in response to the third one of the input signals and is responsive to the flip operating condition of said second switching device for changing said first switching device from its flop operating condition to its flip operating condition in response to the fifth one of the input signals.

8. A logic circuit as in claim 1 wherein:

said input comprises a first input terminal for receiving selected ones of the input signals and a second input terminal for receiving others of the input signals;

said means comprises a first gating circuit intercoupling said first, second, and third switching devices for cyclic operation in a forward direction through said flip-flip-flip, flop-flip-flip, flop-flop-flip, flip-flop-flop, and flip-flip-flop operating states, said first gating circuit also being coupled to said first input terminal for making the first, second, and third switching devices capable of sequentially changing from each of said operating states to the succeeding adjacent one of said operating states in the above-named set in response to the selected ones of the input signals; and said means also comprises a second gating circuit intercoupling said first, second, and third switching devices for cyclic operation in a reverse direction through said flip-flip-flip, flop-flip-flip, flop-flop-flip, flip-flop-flop, and flip-flip-flop operating states, said second gating circuit also being coupled to said second input terminal for making the first, second, and third switching devices capable of sequentially changing from each of said operating states to the preceding adjacent one of said operating states in the above-named set in response to the others of the input signals.

9. A logic circuit capable of counting recurring input signals, said circuit comprising:

an input for receiving the input signals;

first, second, and third flip-flop devices, each having flip and flop stable operating states; and means intercoupling said first, second, and third flip-flop devices for cyclic operation in at least one of a forward and a reverse direction through flip-flip-flip, flop-flip-flip, flop-flop-flip, flip-flop-flop, and flip-flip-flop stable operating states, wherein the first, second, and third terms of each of said flip-flip-flip, flop-flip-flip, flop-flop-flip, flip-flop-flop, and flip-flip-flop operating states respectively define the individual operating states of the first, second, and third flip-flop devices, said means also being coupled to said input for making said first, second, and third flip-flop devices capable of changing from each of said flip-flip-flip, flop-flip-flip, flop-flop-flip, flip-flop-flop, and flip-flip-flop operating states to another of said flip-flip-flip, flop-flip-flip, flop-flop-flip, flip-flop-flop, and flip-flip-flop operating states that is adjacent thereto in the named set of operating states in response to the input signals received at said input.

10. A logic circuit as in claim 9 wherein said means comprises a gating circuit for making the first, second, and third flip-flop devices capable of sequentially changing in said one direction through each of said flip-flip-flip, flop-flip-flip, flop-flop-flip, flip-flop-flop, and flip-flip-flop operating states in response to selected operating conditions of said flip-flop devices and to five successive ones of the input signals received at said input.

11. A decade logic circuit capable of counting ten successive input pulses, said decade logic circuit comprising:

an input for receiving the input pulses;

first, second, third, and fourth bistable switching devices, each having flip and flop stable operating conditions;

circuit means coupling said first switching device to said input for changing the operating condition of said first switching device in response to each of the input pulses received at said input; and a gating circuit intercoupling said second, third, and fourth switching devices for cyclic operation in at least one of a forward and reverse direction through flip-flip-flip, flop-flip-flip, flop-flop-flip, flip-flop-flop, and flip-flip-flop stable operating states, wherein the first, second, and third terms of each of said operating states respectively define the individual operating conditions of said second, third, and fourth switching devices during that operating state, said gating circuit being responsive to each of the input pulses received at said input during operation of said first switching device in a selected one of its operating conditions for changing said second, third, and fourth switching devices from whichever one of said operating states they may be in to an adjacent one of said operating states as defined for operation through the above-named set of operating states in said one direction.

12. A reversible decade logic circuit capable of counting a first group of input pulses in a forward direction and a second group of input pulses in the reverse direction, said reversible decade logic circuit comprising:

a first input for receiving pulses of the first group;

a second input for receiving pulses of the second group;

first, second, third, and fourth bistable switching devices, each having flip and flop stable operating conditions;

circuit means coupling said first switching device to said first and second inputs for changing the operating condition of said first switching device in response to each of the input pulses received at said inputs;

a first gating circuit intercoupling said second, third, and fourth switching devices for cyclic operation in a forward direction through flip-flip-flip, flop-flip-flip, flop-flop-flip, flip-flop-flop, and flip-flip-flop stable operating states, wherein the first, second, and third terms of each of said operating states respectively define the individual operating conditions of said second, third, and fourth switching devices during that operating state, said first gating circuit being responsive to each of the input signals received at said first input during operation of said first switching device in one of its operating conditions for changing said second, third, and fourth switching devices from whichever one of said operating states they may be in to the succeeding adjacent one of said operating states as defined for operation through the above-named set of operating states in the forward direction; and a second gating circuit intercoupling said second, third, and fourth switching devices for cyclic operation in the reverse direction through said flip-flip-flip, flop-flip-flip, flop-flop-flip, flip-flop-flop, and flip-flip-flop operating states, said second gating circuit being responsive to each of the input signals received at said second input during operation of said first switching device in the other of its operating conditions for changing said second, third, and fourth switching devices from whichever one of said operating states they may be in to the succeeding adjacent one of said operating states as defined for operation through the above-named set of operating states in the reverse direction.

13. An improved quinary logic circuit for counting recurring input signals, said circuit comprising:

first, second, and third bistable switching elements each having a pair of inputs and each operating in one of two stable conditions in response to application of said input signals at one of said inputs and in the other of said stable conditions in response to application of said input signals at the other of said inputs;

a first gating element connected to apply selected ones of said input signals to one input of said first switching element in response to an output signal from one of said second and third switching elements;

a second gating element connected to apply selected ones of said input signals to the other input of said first switching element in response to an output signal from one of said second and third switching elements;

a third gating element connected to apply selected ones of said input signals to one input of said second switching element in response to an output signal from one of said first and third switching elements;

a fourth gating element connected to apply selected ones of said input signals to the other input of said second switching element in response to an output signal from one of said first and third switching elements;

a fifth gating element connected to apply selected ones of said input signals to one input of said third switching element in response to an output signal from one of said first and second switching elements; and a sixth gating element connected to apply selected ones of said input signals to the other input of said third switching element in response to an output signal from one of said first and second switching elements.

References Cited

UNITED STATES PATENTS 2,538,122 1/1951 Potter ------------ 235—92 X

ARTHUR GAUSS, *Primary Examiner.*

J. ZAZWORSKY, *Assistant Examiner.*